US011150880B1

(12) United States Patent
Parisa et al.

(10) Patent No.: US 11,150,880 B1
(45) Date of Patent: Oct. 19, 2021

(54) AUTOMATING AN ADOPTION OF CLOUD SERVICES

(71) Applicant: INTERNATIONAL BUSINESS MACHINES CORPORATION, Armonk, NY (US)

(72) Inventors: Venkata Vinay Kumar Parisa, Secunderabad (IN); Bruce G. Taylor, Golden, CO (US); Debasis Roy Choudhuri, Kolkata (IN); Laurence Swift, Atlanta, GA (US); Corey Allen, Nicholasville, KY (US); Biswajit Mohapatra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/946,227

(22) Filed: Jun. 11, 2020

(51) Int. Cl.
| | |
|---|---|
| *G06F 8/36* | (2018.01) |
| *G06N 20/00* | (2019.01) |
| *G06F 8/33* | (2018.01) |
| *G06F 40/30* | (2020.01) |
| *G06F 8/61* | (2018.01) |

(52) U.S. Cl.
CPC ............ *G06F 8/36* (2013.01); *G06F 8/33* (2013.01); *G06F 40/30* (2020.01); *G06N 20/00* (2019.01); *G06F 8/61* (2013.01)

(58) Field of Classification Search
CPC ............. G06F 8/36; G06F 8/61; G06N 20/00
USPC ................................................. 717/106–119
See application file for complete search history.

(56) References Cited

U.S. PATENT DOCUMENTS

| 7,577,939 | B2 | 8/2009 | Bayardo, Jr. | |
|---|---|---|---|---|
| 10,162,610 | B2 | 12/2018 | Apte | |
| 2016/0065436 | A1* | 3/2016 | Disciascio | H04L 67/32 709/224 |
| 2016/0071022 | A1* | 3/2016 | Bruno | G06F 16/3349 706/12 |
| 2019/0171966 | A1* | 6/2019 | Rangasamy | G06N 20/00 |

(Continued)

FOREIGN PATENT DOCUMENTS

| CN | 110489110 A | 11/2019 |
|---|---|---|
| GN | 107832062 A | 3/2018 |

OTHER PUBLICATIONS

Yakoob, S. K. "Advanced Machine Learning Approach to Handle Code Injection Attacks in Cloud Computing." Turkish Journal of Computer and Mathematics Education (TURCOMAT) 12.10 (2021):pp. 4623-4629. (Year: 2021).*

(Continued)

*Primary Examiner* — Satish Rampuria
(74) *Attorney, Agent, or Firm* — Schmeiser, Olsen & Watts; William H. Hartwell (57) ABSTRACT

An approach is provided for automating an adoption of cloud services. A machine learning model is devApplice­loped to learn application source code accessed from a source code repository. The machine learning model is trained by building training data that includes the application source code and technical labels. Services are extracted from the application source code and a context of the application source code is derived. Using a decision tree model, a mapping of the extracted services to respective cloud services is determined. Based on the mapping, portions of the application source code are identified that are recommended to be replaced by the respective cloud services.

20 Claims, 7 Drawing Sheets

(56) References Cited

U.S. PATENT DOCUMENTS

| | | |
|---|---|---|
| 2019/0227774 A1 | 7/2019 | Banuelos |
| 2019/0243622 A1 | 8/2019 | Allamanis |
| 2019/0253485 A1 | 8/2019 | Jyoti Banerjee |
| 2019/0391956 A1* | 12/2019 | Kozhaya ............. G06F 9/44521 |
| 2020/0026577 A1 | 1/2020 | Dias |
| 2020/0394566 A1* | 12/2020 | Martin .................... H04L 67/40 |

OTHER PUBLICATIONS

Spens, Henrik, and Johan Lindgren. "Using cloud services and machine learning to improve customer support: Study the applicability of the method on voice data." (2018).pp. 1-62 (Year: 2018).*

García, Álvaro López, et al. "A cloud-based framework for machine learning workloads and applications." IEEE access 8 (2020): pp. 18681-18692. (Year: 2020).*

Mell, Peter et al.; "The NIST Definition of Cloud Computing;" National Institute of Standards and Technology; Special Publication 800-145; Sep. 2011; 7 pages.

Bommadevara, Nagendra et al.; Cloud adoption to accelerate IT modernization; McKinsey Digital; Apr. 2018; 13 pages.

Cloud Academy Team; Why Large-Scale Enterprises Are Migrating to the Cloud; Cloud Academy Blog; Oct. 10, 2017; 11 pages.

Notification of Transmittal or the International Search Report and the written Opinion of the International Searching Authority, or the Declaration; dated Aug. 11, 2021; International Application No. PCT/CN2021/092066; Filing Date Jul. 7, 2021; 9 pages.

* cited by examiner

```
String host = "smtp.company.com"; //hosted as an IaaS
String from = "user name";
Properties props = System.getProperties();
props.put("mail.smtp.host", host);
props.put("mail.smtp.user", from);
props.put("mail.smtp.password", "asdfgh");
props.put("mail.smtp.port", "587");
props.put("mail.smtp.auth", "true");

Session session = Session.getDefaultInstance(props, null);
MimeMessage message = new MimeMessage(session);
message.setFrom(new InternetAddress(from));

InternetAddress[ ] to_address = new InternetAddress(to.length);
int i = 0;
// To get the array of addresses
while (to[i] != null) {
    to_address[i] = new InternetAddress(to[i]);
    i++;
}
message.setSubject ("sending in a group");
message.setText ("Welcome to abcdMail");
// alternately, to send HTML mail:
// message.setContent("<p>Welcome to abcdMail</p>", "text.html");
Transport transport = session.getTransport("smtp");
transport.connect("smtp.mail.xyz.co.in", "user name", "asdfgh")
transport.sendMessage(message, message.getAllRecipients() );
transport.close();
```

```
// using defg's abcd Library
// https://qrst.com/defg/defg-abcd
import com.defg.*;
import abcd.io.IOException;

public class Example {
    public static void main(String[ ] args) throws IOException {
        Email from = new Email(test@example.com);
        String subject = "Sending with defg is Fun"
        Email to = new Email(test@example.com");
        Content content = new Content("text/plain", "and easy to do
        anywhere, even with abcd");
        Mail mail = new Mail(from, subject, to, content);
        defg de = new defg(System.getenv("defg.API_key"));
        Request request = new Request();
        try {
           request.setMethod(Method.POST);
           request.setEndpoint("mail/sent");
           request.setBody(mail.build() );
           Response response = de.api(request);
           System.out.println(response.getStatusCode() );
           System.out.println(response.getBody() );
           System.out.println(response.getHeaders() );
        } catch (IOException ex) {
           throw ex;
        }
    }
}
```

AUTOMATING AN ADOPTION OF CLOUD SERVICES

BACKGROUND

The present invention relates to cloud and systems infrastructure management, and more particularly to identifying portions of code that can be replaced with cloud services and recommending minimal code refactoring to incorporate cloud services.

Organizations are increasingly adopting hybrid cloud services to modernize their applications and reduce their usage of traditional data center operations. By adopting a cloud-based service, an organization can (i) reduce the maintenance burden, (ii) have access to an amount of resources that is effectively unlimited, (iii) use features that are continuously being improved by the service provider, and (iv) adopt a pay per use model for service consumption. Application developers use a known manual technique called refactoring to adopt cloud services. Refactoring involves changing the application code internally without changing the behavior of the application externally.

SUMMARY

In one embodiment, the present invention provides a computer-implemented method of automating an adoption of cloud services. The method includes developing, by the one or more processors, a machine learning model to learn application source code accessed from a source code repository. The method further includes training, by the one or more processors, the machine learning model by building training data that includes the application source code and technical labels. The method further includes based on the training data, extracting, by the one or more processors, services from the application source code and deriving, by the one or more processors, a context of the application source code. The extracting and the deriving are performed by applying the machine learning model to the application source code. The method further includes using a natural language processing module and based on the context of the application source code, determining, by the one or more processors, functionalities of the extracted services. The method further includes using a decision tree model and based on the functionalities of the extracted services, determining, by the one or more processors, a mapping of the extracted services to respective cloud services, so that a functionality of one or more cloud services mapped to a given extracted service by the mapping matches a functionality of the given extracted service. The method further includes based on the mapping, identifying, by the one or more processors, portions of the application source code that are recommended to be replaced by the respective cloud services.

In another embodiment, the present invention provides a computer program product for automating an adoption of cloud services. The computer program product includes one or more computer readable storage media. Computer readable program code is collectively stored on the one or more computer readable storage media. The computer readable program code is executed by a central processing unit (CPU) of a computer system to cause the computer system to perform a method analogous to the method of automating an adoption of cloud services discussed above.

In another embodiment, the present invention provides a computer system. The computer system includes a central processing unit (CPU), a memory coupled to the CPU, and one or more computer readable storage media coupled to the CPU. The one or more computer readable storage media collectively contain instructions that are executed by the CPU via the memory to implement a method of automating an adoption of cloud services, which is analogous to the method of automating an adoption of cloud services discussed above.

DETAILED DESCRIPTION

Overview

Most applications that are being migrated to cloud services are being migrated as-is, without taking advantage of the underlying flexibility and benefits the cloud services offer. To take advantage of the cloud services in a model based on software as a service (SaaS) or platform as a service (PaaS), parts of applications must be re-engineered, so they can be hosted on the cloud. It is difficult for the application developers to prioritize the re-engineering efforts because they are busy developing new requirements and maintaining and supporting the application. Large organizations also migrate applications as-is to the cloud due to (i) a lack of application knowledge and a lack of skills to re-engineer the application, and (ii) a need to meet deadlines pertaining to a contract or data center exit. Thus, organizations are unable to realize a return on investment (ROI) for their cloud investments.

Conventional refactoring to adopt cloud services is time-consuming, requires significant effort, is done manually by a team of application developers, and is done to execute the program at an enterprise level that may involve hundreds of applications. Each application must be manually refactored, resulting in a huge effort and cost. A refactoring of an application in its entirety to a cloud-native architecture has its own disadvantages, where some of the services are used for the sake of keeping the application fully cloud-native while adding little or no business value.

Embodiments of the present invention address the unique challenges of conventional cloud adoption approaches by using only those cloud services that add significant business value while other services are kept configured in the hybrid setup. Embodiments of the present invention automate the adoption of cloud services by applying natural language processing to learn source code and derive the context of the source code, and apply decision tree machine learning models to identify portions of the code and/or modules within an application that can be replaced by cloud services.

Embodiments of the present invention provide an automated approach to facilitating an organization's adoption of cloud services by identifying the cloud services that an organization can use. Embodiments of the present invention provide a scalable approach of application code learning of all applications of a portfolio in all source code repositories that are present in an organization, which provides for modernization at a decreased effort and cost as compared to the existing approach of looking at applications individually.

Embodiments of the present invention generate a service catalog of a list of portions of code and/or modules within an application that can be replaced by cloud services, thereby enabling the reuse of the service and providing for a rationalization of the applications by ensuring there is no redundant code or service.

Embodiments of the present invention suggest code changes for each recommended cloud service. Embodiments of the present invention focus on "quick wins" to identify the systems of engagement and systems of insight components and to identify minimal changes to fast-track customer adoption of cloud services. Systems of engagement include, for example, interactions logic, personalized customer context, advanced user experience, advanced collaboration, and business ecosystem support. Systems of insight include, for example, business intelligence, intelligent systems, advanced analytics, engagement data, operational data, enterprise content management data, informational data and big data.

Embodiments of the present invention assist an organization in its adoption of cloud services in an incremental manner as opposed to a big bang approach, thereby enabling cost savings for the organization and helping the organization realize the ROI for the cloud investments.

Embodiments of the present invention enable an organization to move towards composable architecture. For new application development, application developers can compose the application by utilizing the services and/or modules that are already used across many applications and focus on new business logic.

Embodiments of the present invention integrates with cloud brokerage tools to determine and display the financial gains in adopting the cloud services.

System for Automating an Adoption of Cloud Services

Figure 1:
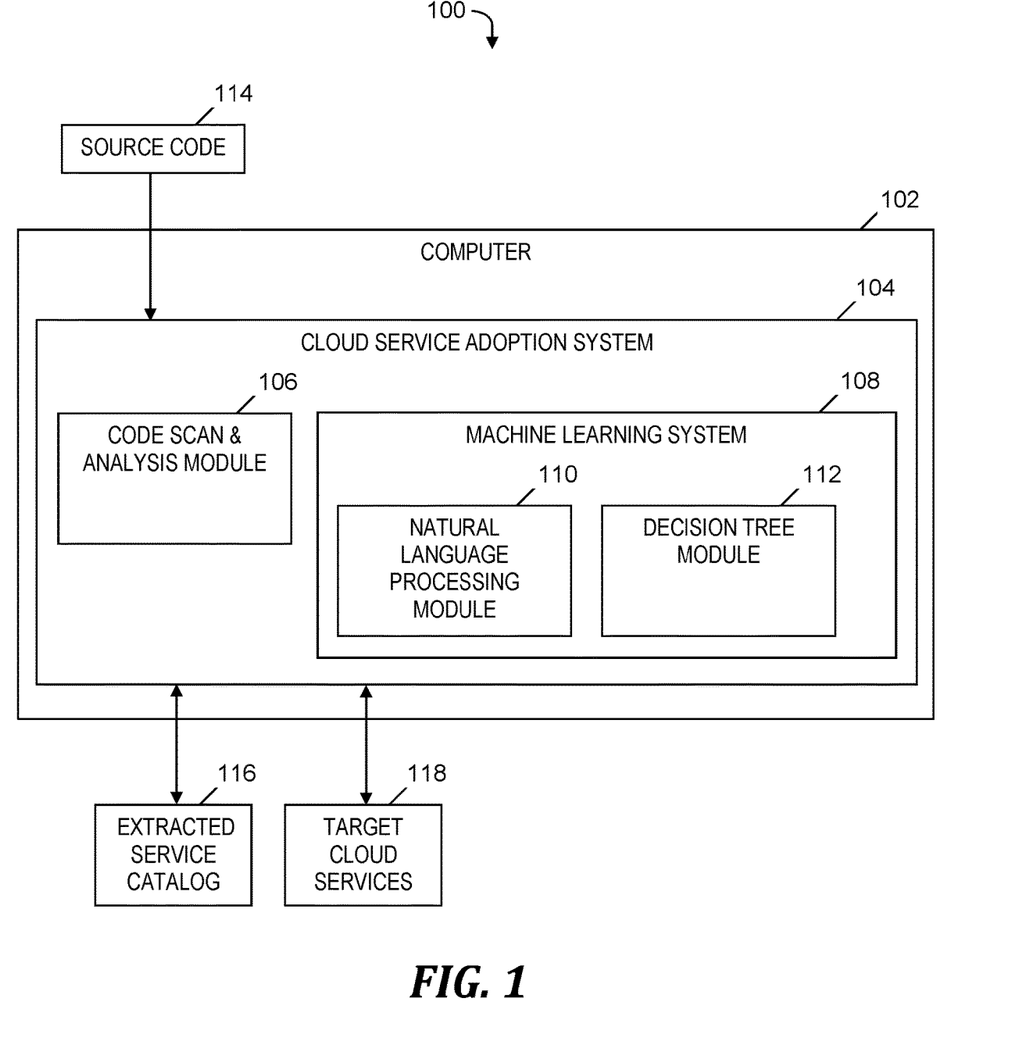
FIG. 1 is a block diagram of a system for automating an adoption of cloud services, in accordance with embodiments of the present invention.

FIG. 1 is a block diagram of a system 100 for automating an adoption of cloud services, in accordance with embodiments of the present invention. System 100 includes a code scan and analysis module 106 and a machine learning system 108, which includes a natural language processing module 110 and a decision tree module 112. Cloud service adoption system 104 automates an adoption of cloud services.

Cloud service adoption system 104 receives a source code 114 of a software application. Source code 114 is also referred to herein as application source code. Natural language processing module 110 learns source code 114 and derives a context of source code 114. Code scan and analysis module 106 scans and analyzes source code 114 and analyzes a configuration of the application.

Cloud service adoption system 104 identifies and groups similar services used across multiple applications and generates an extracted service catalog 116 (i.e., a catalog of services extracted from source code of the multiple applications), thereby enabling reuse of code across applications, where the reuse of the code facilitates composable architecture. The extracted service catalog 116 allows application owners to have the flexibility of reusing the code with multiple existing applications or with applications being newly developed. Extracted service catalog 116 facilitates rationalization of applications at a code level and removes redundant code.

Machine learning system 108 identifies and recommends target cloud services 118 that can replace existing modules and services included in source code of applications, including source code 114. Decision tree module 112 identifies portions of source code 114 and other source code (not shown) that can be replaced by target cloud services 118. Decision tree module 112 applies a decision model (i.e., polynomial model) to map the services extracted from source code 114 to target cloud services 118. Decision tree module 112 identifies services that can be replaced by target cloud services 118. In one embodiment, target cloud services 118 include services provided by a public cloud, services provided by an off-premises private cloud, services provided by a software cloud configuration (e.g. IBM® Cloud Private), and/or serverless computing services (e.g., IBM® function as a service (FaaS)). IBM is a registered trademark of International Business Machines Corporation located in Armonk, N.Y. In one embodiment, the application of the decision tree model is based on a hybrid cloud configuration of an organization (i.e., the hybrid cloud configuration to which the organization is subscribed).

Code scan and analysis module 106 determines and recommends changes to the portions of code identified by decision tree module 112 as being replaceable by cloud services in target cloud services 118. Implementing the recommended changes to the portions of the code provide the adoption of the recommended cloud services. Code scan and analysis module 106 determines and recommends a minimized amount of code refactoring to incorporate cloud service(s) (i.e. recommends refactoring portions of source code 114, but not the entirety of source code 114).

Cloud service adoption system 104 integrates with cloud brokerage tools (not shown) determine and display financial benefits of adopting the cloud services.

The functionality of the components shown in FIG. 1 is described in more detail in the discussion of FIG. 2, FIGS. 3A-3B, and FIG. 4 presented below.

Process for Automating an Adoption of Cloud Services

Figure 2:
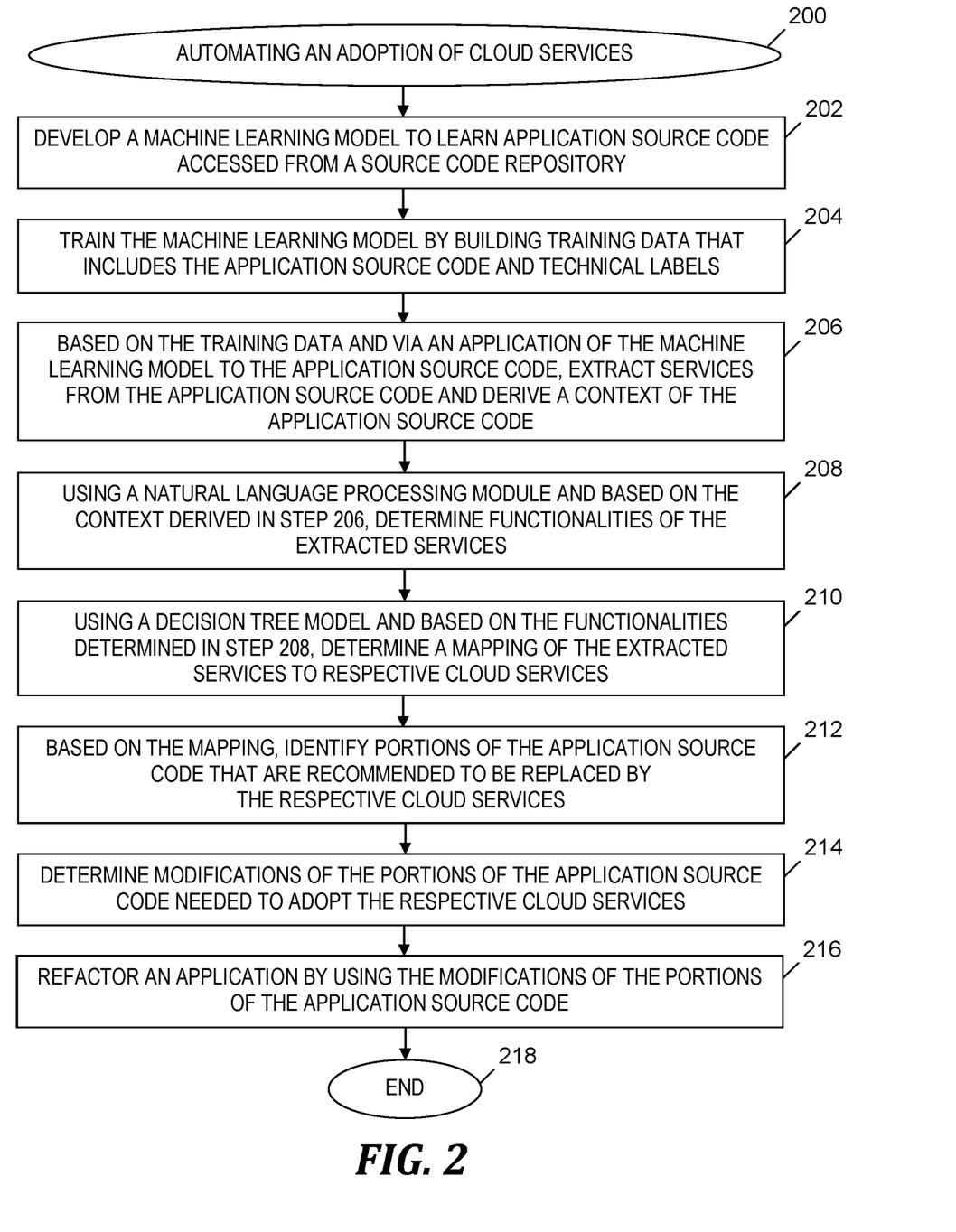
FIG. 2 is a flowchart of a process of automating an adoption of cloud services, where the process is implemented in the system of FIG. 1, in accordance with embodiments of the present invention.

FIG. 2 is a flowchart of a process of automating an adoption of cloud services, where the process is implemented in the system of FIG. 1, in accordance with embodiments of the present invention. The process of FIG. 2 starts at step 200. In step 202, cloud service adoption system 104 (see FIG. 1) develops a machine learning model in machine learning system 108 (see FIG. 1) to learn source code 114 (see FIG. 1) of an application and to learn the configuration of the application. Cloud service adoption system 104 (see FIG. 1) accesses source code 114 (see FIG. 1) from a source code repository.

In one embodiment, developing the machine learning model in step 202 includes developing a natural language processing model by using a multi-label text classification approach. In one embodiment, cloud service adoption system 104 (see FIG. 1) treats the learning of the source code 114 (see FIG. 1) in step 202 as a clustering problem in statistics (e.g., using K means clustering on the source code repository, where the optimum value of K is finalized using an elbow method). In another embodiment, cloud service adoption system 104 (see FIG. 1) uses an n gram model and perplexity approach to learn the source code 114 (see FIG. 1).

In another embodiment, cloud service adoption system 104 (see FIG. 1) in step 202 uses term frequency (tf) and inverse document frequency (idf) of texts as the input parameter for a deep learning model (i.e., multiple hidden unit neural network). Cloud service adoption system 104 (see FIG. 1) employs a customized model of tf–idf, which uses word embedding as an input feature matrix for a sequence predication model, which captures the entire pattern in the source code 114 (see FIG. 1) instead of the frequency of a few key words. Cloud service adoption system 104 (see FIG. 1) uses cross validation to tune the parameter of the model for better model accuracy.

In step 204, cloud service adoption system 104 (see FIG. 1) trains the machine learning model by building training data that includes source code 114 (see FIG. 1) and technical labels. Cloud service adoption system 104 (see FIG. 1) creates a code pattern configuration file which contains specific key words based on the available cloud services in target cloud services 118 (see FIG. 1). Machine learning system 108 (see FIG. 1) looks for the key words and understands code snippets included in source code 114 (see FIG. 1).

In one embodiment, step 204 includes cloud service adoption system 104 (see FIG. 1) generating a code pattern configuration file that includes key words specifying available cloud services included in target cloud services 118 (see FIG. 1). Cloud service adoption system 104 (see FIG. 1) identifies the key words included in a portion of the source code 114 (see FIG. 1).

In step 206, based on the training data and via an application of the machine learning model to source code 114 (see FIG. 1), cloud service adoption system 104 (see FIG. 1) scans source code 114 (see FIG. 1), extracts services from source code 114 (see FIG. 1), and derives a context of source code 114 (see FIG. 1) (i.e., contextualizes the source code). In one embodiment, cloud service adoption system 104 (see FIG. 1) uses natural language processing provided by natural language processing module 110 (see FIG. 1) to perform step 206.

In one embodiment, machine learning system 108 (see FIG. 1) applies a machine learning model developed on the source code repository and the application configuration to extract the services and derive the context of source code for the source code files in the source code repository.

In step 208, using natural language processing module 110 and based on the context derived in step 206, cloud service adoption system 104 (see FIG. 1) determines functionalities of the services extracted in step 206 (also referred to herein as "extracted services"). For example, cloud service adoption system 104 (see FIG. 1) determines that the functionality of an extracted service is an email delivery function. An extracted service having a functionality that matches the functionality of a cloud service included in target cloud services 118 means that the extracted service can be replaced with the cloud service.

In step 210, using a decision tree model (e.g., polynomial model) included in decision tree module 112 (see FIG. 1) and based on the functionalities of the extracted services determined in step 208, cloud service adoption system 104 (see FIG. 1) determines a mapping of the extracted services to respective cloud services included in target cloud services 118 (see FIG. 1). The mapping is determined in step 210 so that a functionality of one or more cloud services mapped to a given extracted service matches a functionality of the given extracted service. For example, if a given extracted service is an email delivery service, then the mapping determined in step 210 maps the extracted email delivery service to a first email delivery cloud service provided by Cloud Service Provider 1 and to a second email delivery cloud service provided by Cloud Service Provider 2.

In one embodiment, step 210 includes cloud service adoption system 104 (see FIG. 1) mapping a first one or more extracted services included in the services extracted in step 206 to respective one or more public cloud services and mapping a second one or more extracted services included in the services extracted in step 206 to respective one or more private cloud services.

In step 212, based on the mapping determined in step 210, cloud service adoption system 104 (see FIG. 1) identifies portions of source code 114 (see FIG. 1) that are recommended to be replaced by the aforementioned respective cloud services. In one embodiment, step 212 includes cloud service adoption system 104 (see FIG. 1) generating a recommendation of an optimal (i.e., minimized) amount of refactoring of a portion of code included in the source code 114 (see FIG. 1) to incorporate a cloud service included in target cloud services 118.

In one embodiment, step 212 includes cloud service adoption system 104 (see FIG. 1) determining and displaying respective costs of adopting the cloud services that are recommended to replace a given extracted service, where the costs are used to distinguish among the recommended cloud services.

In one embodiment, step 212 includes based on the identified portions of the source code 114 (see FIG. 1), cloud service adoption system 104 (see FIG. 1) recommends multiple target cloud services included in target cloud services 118 (see FIG. 1) to replace modules in source code 114 (see FIG. 1).

In step 214, cloud service adoption system 104 (see FIG. 1) determines modifications of the portions of code that are needed to adopt the respective cloud services, where the portions of the code are the portions identified in step 212.

In step 216, cloud service adoption system 104 (see FIG. 1) refactors an application by using and implementing the modifications determined in step 214. In one embodiment, step 216 is performed in response to cloud service adoption system 104 (see FIG. 1) receiving a user selection of one cloud service included in the multiple cloud services that are recommended to replace an extracted service in step 212.

After step 216, the process of FIG. 2 ends at step 218.

In one embodiment, cloud service adoption system 104 (see FIG. 1) determines financial benefits of adopting cloud services included in target cloud services 118 (see FIG. 1) by integrating with cloud brokerage tools. cloud service adoption system 104 (see FIG. 1) displays the cloud services that are to replace the portions of the source code 114 (see FIG. 1) and also displays the financial benefits of adopting the cloud services. The displaying of the cloud services and the financial benefits is performed on a display device for viewing by a customer.

In one embodiment, for each application in an application portfolio of an organization, cloud service adoption system 104 (see FIG. 1) repeats the performance of step 202 through step 212.

Example

Figure 3A:
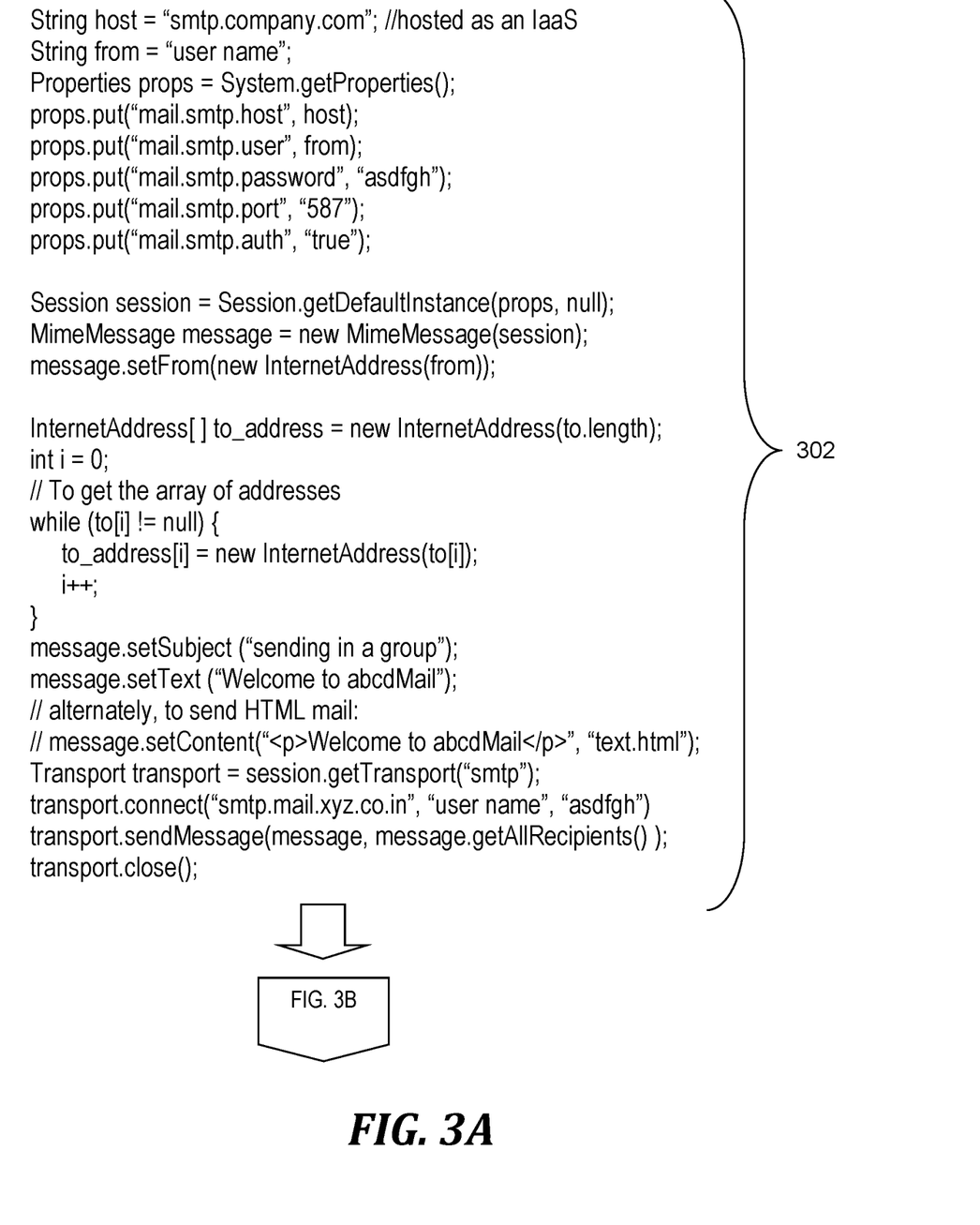
FIGS. 3A-3B depict an example of an application code scan used in the process of FIG. 2, in accordance with embodiments of the present invention.
Figure 3B:
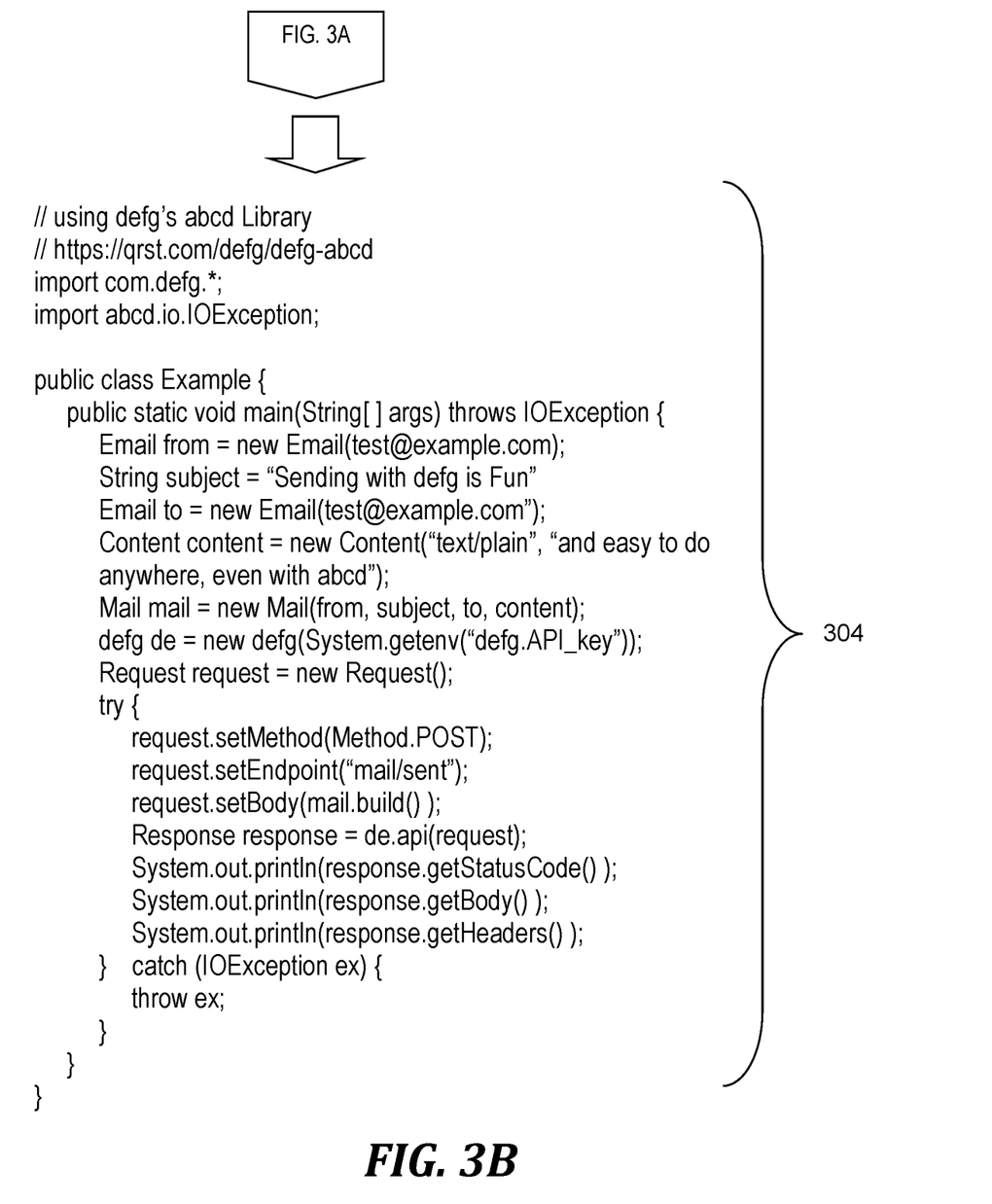

FIGS. 3A-3B depict an example of an application code scan used in the process of FIG. 2, in accordance with embodiments of the present invention. In this example, cloud service adoption system 104 (see FIG. 1) in step 202 (see FIG. 2) learns the source code 114 (see FIG. 1) and in step 210 (see FIG. 2) identifies a code excerpt 302 in FIG. 3A that uses a custom-built Simple Mail Transfer Protocol (smtp) server (i.e., an email server) hosted in an environment of an application owned by an application owner. Cloud service adoption system 104 (see FIG. 1) (see FIG. 2) generates and displays a recommendation to the application owner about a third-party cloud service. Cloud service adoption system 104 (see FIG. 1) in step 214 (see FIG. 2) generates and displays a recommended code modification 304 in FIG. 3B, where the recommended code modification is a modification of code excerpt 302 in FIG. 3A. In code modification 304, "defg" is an example of an identifier of an email delivery service provided by a cloud service. The application owner refactors the code of the application, which includes changing code excerpt 302 (see FIG. 3A) to code modification 304 (see FIG. 3B). By using the refactored code, the application owner replaces an expensive dedicated smtp server with a cloud service resulting an estimated 60% savings in cost.

Computer System

Figure 4:
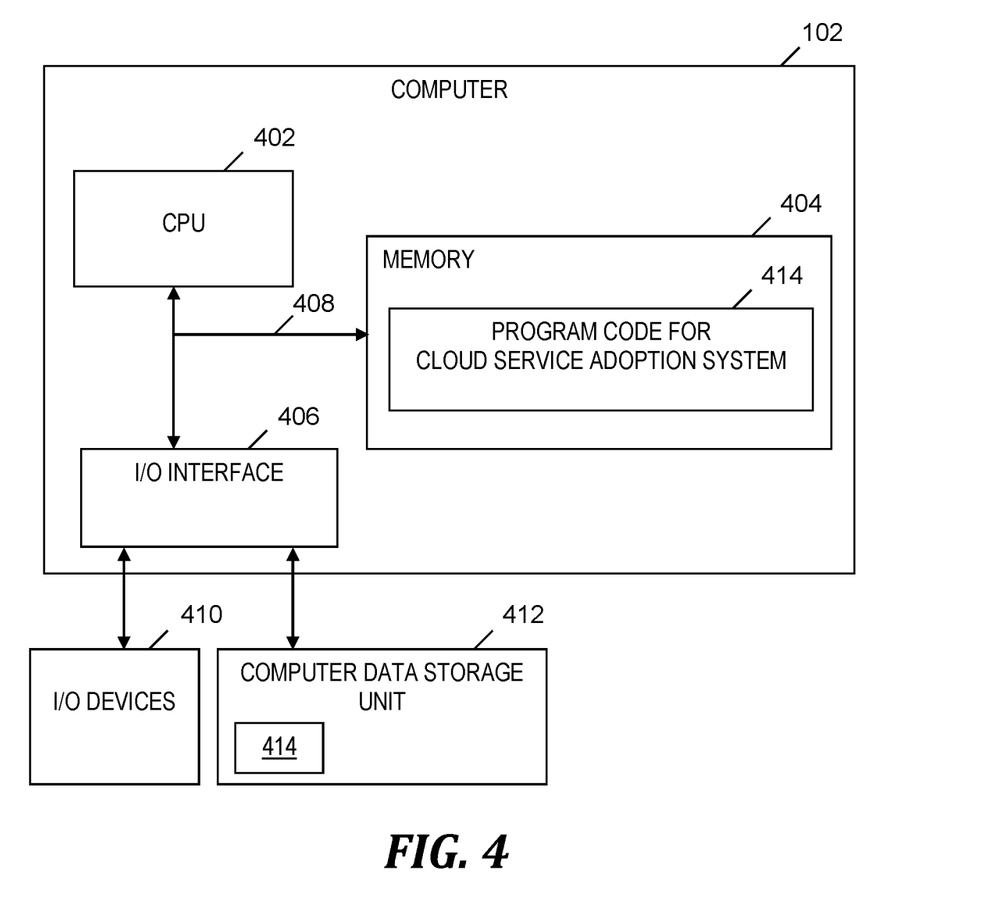
FIG. 4 is a block diagram of a computer included in the system of FIG. 1 and that implements the process of FIG. 2, in accordance with embodiments of the present invention.

FIG. 4 is a block diagram of a computer included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for cloud service adoption system 104 (see FIG. 1) to perform a method of automating an adoption of cloud services, where the instructions are executed by CPU 402 via memory 404. CPU 402 may include a single processing unit or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk). Alternately, multiple computer data storage units replace the single computer data storage unit 412, where multiple computer readable storage media are included in the respective computer data storage units.

Memory 404 and/or storage unit 412 may store computer program code 414 that includes instructions that are executed by CPU 402 via memory 404 to automate an adoption of cloud services. Alternately, multiple computer data storage units that include multiple computer readable storage media collectively store computer program code 414. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to automating an adoption of cloud services. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to automate an adoption of cloud services. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of automating an adoption of cloud services.

While it is understood that program code 414 for automating an adoption of cloud services may be deployed by manually loading directly in client, server and proxy computers (not shown) via loading one or more computer readable storage media (e.g., computer readable storage medium included in computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of automating an adoption of cloud services. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., a computer readable storage medium included in computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
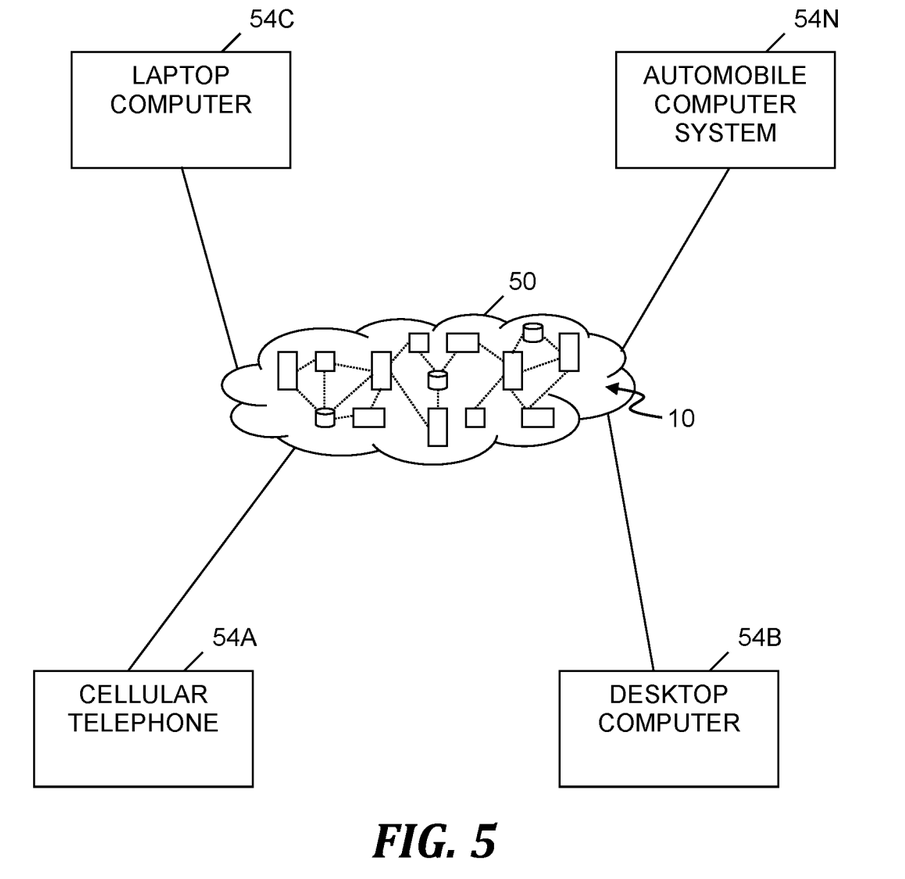
FIG. 5 depicts a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
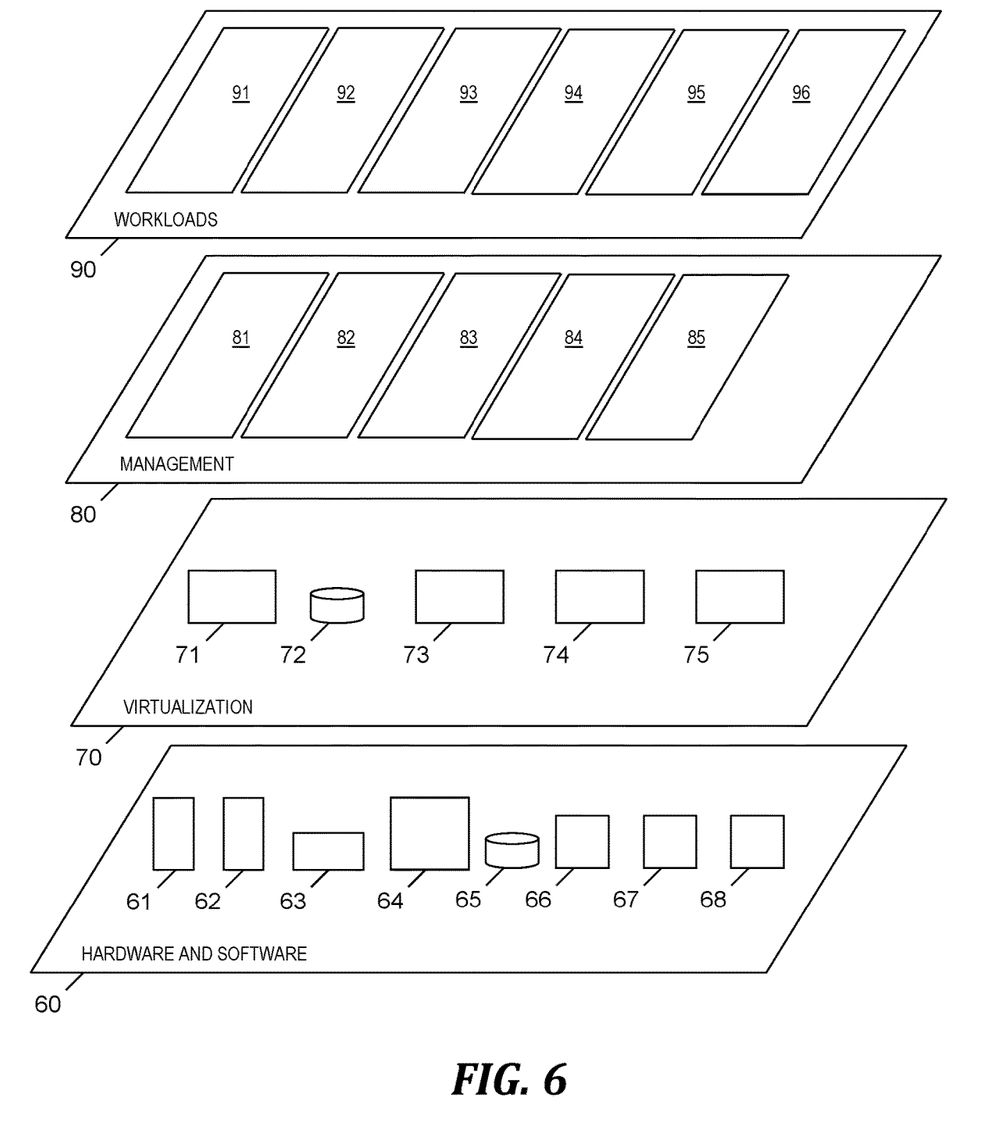
FIG. 6 depicts abstraction model layers, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated adoption of cloud services 96.

What is claimed is:

1. A computer-implemented method of automating an adoption of cloud services, the method comprising:
    developing, by the one or more processors, a machine learning model to learn application source code accessed from a source code repository;
    training, by the one or more processors, the machine learning model by building training data that includes the application source code and technical labels; based on the training data, automatically extracting, by the one or more processors, services from the application source code and deriving, by the one or more processors, a context of the application source code, the extracting and the deriving performed by applying the machine learning model to the application source code;
    using a natural language processing module and based on the context of the application source code, determining, by the one or more processors, functionalities of the extracted services;
    using a decision tree model and based on the functionalities of the extracted services, determining, by the one or more processors, a mapping of the extracted services to respective cloud services, so that a functionality of one or more cloud services mapped to a given extracted service by the mapping matches a functionality of the given extracted service; and
    based on the mapping, identifying, by the one or more processors, portions of the application source code specifying the extracted services, the portions of the application source code being recommended for the adoption to be replaced by the respective cloud services.

2. The method of claim 1, wherein the identifying the portions of the application source code that are recommended to be replaced by the respective cloud services includes generating a recommendation of an optimal amount of refactoring of a portion of code included in the application source code to incorporate a cloud service included in the cloud services.

3. The method of claim 1, further comprising based on the identified portions of the application source code, recommending, by the one or more processors, target cloud services to replace existing modules in the application source code.

4. The method of claim 1, further comprising:
    determining, by the one or more processors, modifications of the portions of the application source code needed to adopt the respective cloud services; and
    refactoring, by the one or more processors, an application by using the modifications of the portions of the application source code.

5. The method of claim 1, further comprising:
    determining, by the one or more processors, financial benefits of adopting the cloud services by integrating with cloud brokerage tools; and
    displaying, by the one or more processors, (i) the cloud services that are to replace the portions of the application source code and (ii) the financial benefits of adopting the cloud services, the displaying performed on a display device for viewing by a customer.

6. The method of claim 1, wherein the determining the mapping of the extracted services to the respective cloud services includes mapping a first one or more extracted services included in the extracted services to respective one or more public cloud services and mapping a second one or more extracted services included in the extracted services to respective one or more private cloud services.

7. The method of claim 1, wherein the training includes:
    generating, by the one or more processors, a code pattern configuration file that includes key words specifying available cloud services; and
    identifying, by the one or more processors, the key words included in a portion of the application source code.

8. The method of claim 1, wherein the developing the machine learning model includes developing a natural language processing model by using a multi-label text classification approach.

9. The method of claim 1, further comprising repeating, by the one or more processors, for each application in an application portfolio of an organization, the developing the machine learning model, the training the machine learning model, the extracting the services from the application source code and the deriving the context of the application source code by applying the machine learning model to the application source code, the determining the functionalities of the extracted services, the determining the mapping, and the identifying the portions of the application source code that are recommended to be replaced.

10. The method of claim 1, further comprising:
providing at least one support service for at least one action selected from the group consisting of creating, integrating, hosting, maintaining, and deploying computer readable program code in a computer, the program code being executed by a processor of the computer to implement the developing the machine learning model, the training the machine learning model, the extracting the services from the application source code and the deriving the context of the application source code by applying the machine learning model to the application source code, the determining the functionalities of the extracted services, the determining the mapping, and the identifying the portions of the application source code that are recommended to be replaced.

11. A computer program product for automating an adoption of cloud services, the computer program product comprising:
one or more computer readable storage media having computer readable program code collectively stored on the one or more computer readable storage media, the computer readable program code being executed by a central processing unit (CPU) of a computer system to cause the computer system to perform a method comprising:
the computer system developing a machine learning model to learn application source code accessed from a source code repository;
the computer system training the machine learning model by building training data that includes the application source code and technical labels;
based on the training data, the computer system automatically extracting services from the application source code and the computer system deriving a context of the application source code, the extracting and the deriving performed by the computer system applying the machine learning model to the application source code;
using a natural language processing module and based on the context of the application source code, the computer system determining functionalities of the extracted services;
using a decision tree model and based on the functionalities of the extracted services, the computer system determining a mapping of the extracted services to respective cloud services, so that a functionality of one or more cloud services mapped to a given extracted service by the mapping matches a functionality of the given extracted service; and
based on the mapping, the computer system identifying portions of the application source code that are recommended for the adoption to be replaced by the respective cloud services.

12. The computer program product of claim 11, wherein the identifying the portions of the application source code that are recommended to be replaced by the respective cloud services includes generating a recommendation of an optimal amount of refactoring of a portion of code included in the application source code to incorporate a cloud service included in the cloud services.

13. The computer program product of claim 11, wherein the method further comprises the computer system recommending target cloud services to replace existing modules in the application source code.

14. The computer program product of claim 11, wherein the method further comprises:
the computer system determining modifications of the portions of the application source code needed to adopt the respective cloud services; and
the computer system refactoring an application by using the modifications of the portions of the application source code.

15. The computer program product of claim 11, wherein the method further comprises:
the computer system determining financial benefits of adopting the cloud services by integrating with cloud brokerage tools; and
the computer system displaying (i) the cloud services that are to replace the portions of the application source code and (ii) the financial benefits of adopting the cloud services, the displaying performed on a display device for viewing by a customer.

16. A computer system comprising:
a central processing unit (CPU);
a memory coupled to the CPU; and
one or more computer readable storage media coupled to the CPU, the one or more computer readable storage media collectively containing instructions that are executed by the CPU via the memory to implement a method of automating an adoption of cloud services, the method comprising: the computer system developing a machine learning model to learn application source code accessed from a source code repository;
the computer system training the machine learning model by building training data that includes the application source code and technical labels;
based on the training data, the computer system automatically extracting services from the application source code and the computer system deriving a context of the application source code, the extracting and the deriving performed by the computer system applying the machine learning model to the application source code;
using a natural language processing module and based on the context of the application source code, the computer system determining functionalities of the extracted services;
using a decision tree model and based on the functionalities of the extracted services, the computer system determining a mapping of the extracted services to respective cloud services, so that a functionality of one or more cloud services mapped to a given extracted service by the mapping matches a functionality of the given extracted service; and based on the mapping, the computer system identifying portions of the application source code that are recommended for the adoption to be replaced by the respective cloud services.

17. The computer system of claim 16, wherein the identifying the portions of the application source code that are recommended to be replaced by the respective cloud services includes generating a recommendation of an optimal amount of refactoring of a portion of code included in the application source code to incorporate a cloud service included in the cloud services.

18. The computer system of claim 16, wherein the method further comprises the computer system recommending target cloud services to replace existing modules in the application source code.

19. The computer system of claim 16, wherein the method further comprises:

the computer system determining modifications of the portions of the application source code needed to adopt the respective cloud services; and the computer system refactoring an application by using the modifications of the portions of the application source code.

20. The computer system of claim 16, wherein the method further comprises:

the computer system determining financial benefits of adopting the cloud services by integrating with cloud brokerage tools; and the computer system displaying (i) the cloud services that are to replace the portions of the application source code and (ii) the financial benefits of adopting the cloud services, the displaying performed on a display device for viewing by a customer.

* * * * *